United States Patent [19]
Yamakoshi

[11] Patent Number: 4,796,058
[45] Date of Patent: Jan. 3, 1989

[54] RECORDING APPARATUS

[75] Inventor: Yukiyoshi Yamakoshi, Osaka, Japan

[73] Assignee: Minolta Camera Kabushiki Kaisha, Osaka, Japan

[21] Appl. No.: 139,453

[22] Filed: Dec. 30, 1987

[30] Foreign Application Priority Data

Jan. 6, 1987 [JP] Japan .................. 62-479[U]

[51] Int. Cl.⁴ .................. G03B 29/00; G03B 27/52
[52] U.S. Cl. .................. 355/29; 355/30
[58] Field of Search .................. 355/13, 15, 28–30; 352/130

[56] References Cited

U.S. PATENT DOCUMENTS

| | | | |
|---|---|---|---|
| 2,351,371 | 6/1944 | Smith | 355/30 |
| 3,591,279 | 7/1971 | Gardner et al. | 355/29 |
| 3,914,491 | 10/1975 | Takahashi | 352/130 X |
| 3,936,184 | 2/1976 | Tanaka et al. | 355/30 X |
| 4,050,802 | 9/1977 | Tanaka et al. | 355/30 X |
| 4,074,217 | 2/1978 | Yanagawa | 355/30 |
| 4,262,999 | 4/1981 | Sato et al. | 355/30 X |
| 4,395,793 | 8/1983 | Wedel et al. | 355/30 X |
| 4,429,984 | 2/1984 | Kiba et al. | 355/354 |
| 4,534,632 | 8/1985 | Laviolette | 355/30 X |
| 4,705,388 | 11/1987 | Huntjens et al. | 355/15 |

FOREIGN PATENT DOCUMENTS 59-30555 2/1984 Japan .

Primary Examiner—Richard A. Wintercorn
Attorney, Agent, or Firm—Wenderoth, Lind & Ponack

[57] ABSTRACT

Disclosed herein is a recording apparatus for forming images on a record paper such as plain paper, sensitized paper or film. The apparatus comprises the transport system for feeding the recording paper along a predetermined path, the laser optical system forming an image on said recording paper, cleaning members provided removably in superposed layers which are disposed underneath said path for causing dust to adhere thereto. The cleaning members prevent dust such as paper particles, particles of the coating agent from scattering about and serve for removal of said dust, so that dust may not cause harm to various processing systems.

5 Claims, 2 Drawing Sheets

RECORDING APPARATUS

BACKGROUND OF THE INVENTION

The present invention relates to a recording apparatus, and more pariicularly to a recording apparatus for forming images on record paper such as plain paper, sensitized paper or film.

Recording apparatus having devices for subjecting record paper to various processes such as feeding, transporting and image formation include portions which release or scatter paper particles and like dust. For example, with the recording apparatus wherein sensitized paper in the form of a roll is cut by a cutter into a sheet of specified length to form an image on the cut-off sheet, the sensitized paper 2 releases paper particles, particles of the coating agent, e.g. sensitizer, thereof and like dust D (hereinafter referred to merely as "dust D") every time the paper 2 is cut by the cutter 1 as shown in FIG. 1. The dust D spontaneously falls and scatters below the cutter 1.

The dust D spreads over and adheres to the mechanical, electric or optical system of various devices for processing the sensitized paper 2, entailing the problem of exerting an adverse effect on the processes and impairing the function of the apparatus in its entirety.

It is therefore conventional practice with recording apparatus of this type to periodically remove such an accumulation of dust D as by manually wiping with use of alcohol or the like, or by using a vacuum cleaner. Nevertheless, this procedure involves another problem. It requires labor to periodically remove the dust accumulation from the devices and the neighboring areas before the spilt dust D adversely influences the recording apparatus, while the apparatus must be held out of operation for the removal of dust D.

SUMMARY OF THE INVENTION

The main object of the present invention is to provide a recording apparatus wherein dust is inhibited from scattering or spilling by simple and inexpensive means.

Another object of the invention is to provide a recording apparatus which can be cleaned and maintained easily and quickly.

To fulfill these objects, the invention provides a recording apparatus which has at least two cleaning members removably laminated to each other and disposed at a location where dust is liable to accumulate, each of the cleaning members having an adhesive surface.

BRIEF DESCRIPTION OF THE DRAWINGS

These and other objects and features of the present invention will become apparent from the following description taken in conjunction with the preferred embodiments thereof with reference to the accompanying drawings, in which.

DESCRIPTION OF THE PREFERRED EMBODIMENTS

The present invention will be described in detail with reference to the embodiments illustrated.

Figure 1:
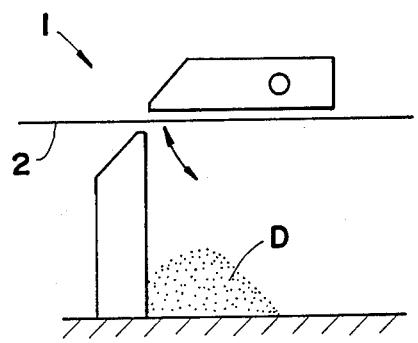
FIG. 1 is a fragmentary diagram for illustrating a conventional recording apparatus.
Figure 2:
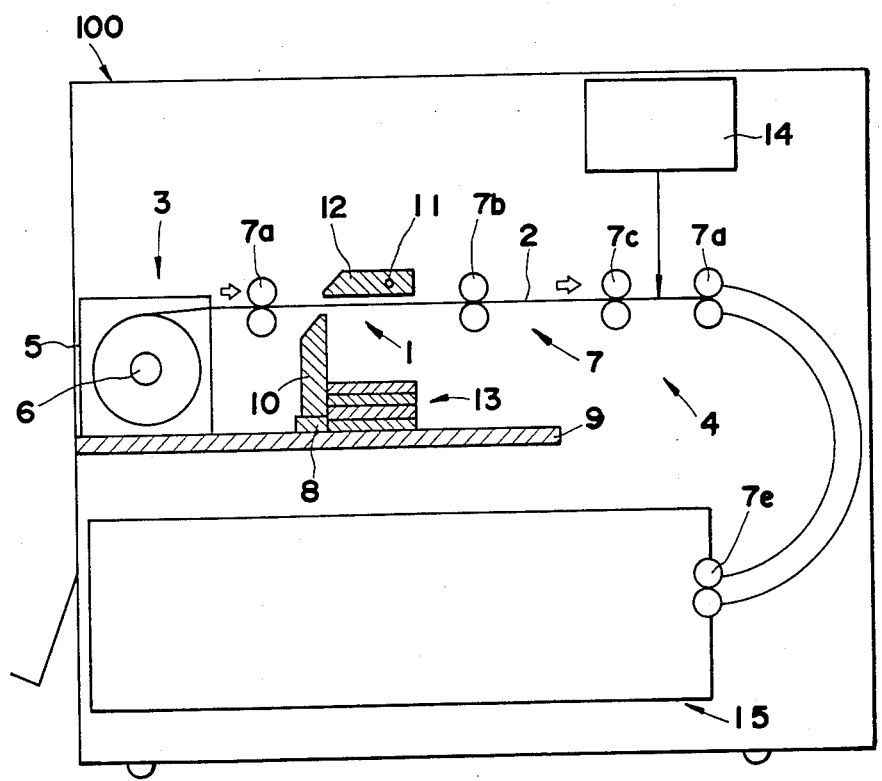
FIG. 2 is a front view in section schematically showing a recording apparatus embodying the invention.

FIG. 2 shows a recording apparatus 100 embodying the invention and comprising container means 3 for sensitized pape 2, a cutter 1 for cutting the sensitized paper 2 to a specified length, a laminate of cleaning members 13 for causing dust to adhere thereto, an exposure unit 4 for exposing the sensitized paper 2 to an optical image, a developing unit 15 for developing the exposed sensitized paper 2, and a transport system 7 for feeding the sensitized paper 2 to the units.

The container means 3 comprises a supply magazine 5 removably mounted on a chassis 9 of the apparatus 100. The supply magazine 5 has accommodated therein the unused sensitized paper as rolled up around a core 6 in the center of the magazine 5. The core 6 is drivingly rotatable by unillustrated drive means.

The transport system 7 is connected to the supply maganzine 5. The illustrated transport system 7 comprises pairs of upper and lower transport rollers 7a, 7b, 7c, 7d and 7e which are arranged at a suitable spacing and drivingly rotated by drive means (not shown). The sensitized paper 2 is nipped between the pairs of rollers and transported by the rotation of the rollers to the cutter 1, then to the exposure unit 4 nnd thereafter to the developing unit 15.

The cutter 1 is interposed between the supply magazine 5 and the exposure unit 4 to be described below. The cutter 1 comprises a stationary blade 10 secured to the chassis 9 by a fixing member 8 and a pivotally movable blade 12 supported on a pivot 11. The stationary blade 10 and the movable blade 12 have a width not smaller than the width of the paper 2. Immediately below the cutter 1, the laminate of cleaning members 13 to be described later is disposed.

The exposure unit 4 has a laser optical system 14 which emits a laser beam from an unillustrated laser light source in accordance with an image signal to form an image on the sensitized paper 2 being transported by the pairs of rollers 7c and 7d.

The exposed sensitized paper 2 is sent into the developing unit 15 by the pair of transport rollers 7e and is subjected to a known developing process.

Figure 3:
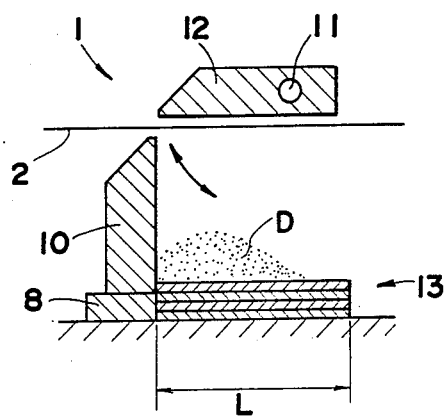
FIG. 3 is an enlarged fragmentary front view in section of the recording apparatus.
Figure 4:
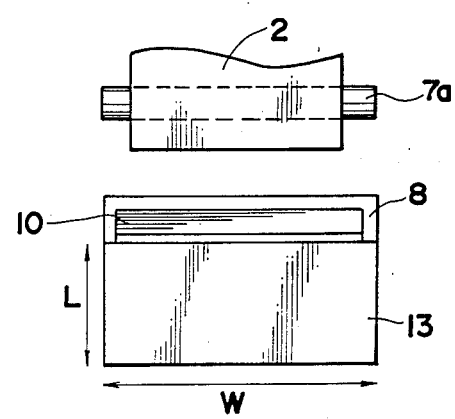
FIG. 4 is a fragmentary plan view of the recording apparatus.

With reference to FIGS. 3 and 4, the laminate of cleaning members 13 is disposed approximately immediately below the cutter 1 which releases and scatters dust D. The cleaning member 13 has a width W at least larger than the width of the sensitized paper 2 transversely thereof and a length L larger than the length of the movable blade 12 of the cutter in the direction of transport of the paper 2. The laminate of cleaning members 13 is positioned on the chassis 9 immediately below the movable blade 12 of the cutter 1 and is in intimate contact at its one end with the fixing member 8 of the stationary blade 10. The cleaning members 13 are removable at a position below the cutter 1 at one side thereof.

Figure 5:
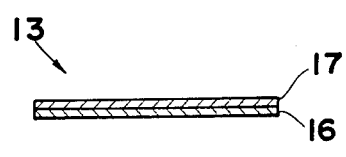
FIG. 5 is a sectional view of a cleaning member.
Figure 6:
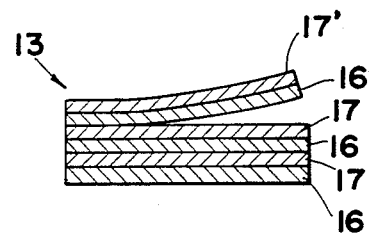
FIG. 6 is a sectional view showing a laminate of a plurality of cleaning members.

The cleaning member 13 comprises a base sheet 16, for example, of paper and an adhesive material 17 covering the base sheet 16. Examples of useful adhesive materials are various adhesive substances which are generally used for rubbers, resins, etc. The adhesive material 17 is applied to the base sheet 16, for example, by coating or adhesion (see FIG. 5). FIG. 6 shows a laminate comprising a plurality of (e.g. three) cleaning members 13 each comprising a base sheet 16 and an adhesive material 17 coating the upper surface of the base sheet 16. To render the cleaning member 13 easy to remove or peel off, the cleaning member 13 may have one end having the base sheet 16 only and not covered with the adhesive material. Alternatively, the layer of adhesive material 17 may be folded over at one end.

The operation and advantages of the present apparatus will be described.

When the core 6 is drivingly rotated with the supply magazine 5 mounted in place, sensitized paper or like sheet 2 is sent into the transport system 7. When the leading end of the sheet 2 is nipped between the pair of transport rollers 7a adjacent to the supply magazine 5, the drive means for the core 6 is turned off, permitting the core to rotate following the movement of the sheet 2.

The sheet 2 is transported by the rotation of the rollers 7a, 7b and 7c of the transport system 7 which are driven. When transported by a predetermined amount, the sheet 2 is stopped, whereupon the movable blade 12 of the cutter is pivotally moved downward to cut the sheet 2. Immediately thereafter, the movable blade 12 pivotally moves upward and returns to the illustrated initial position. The cut-off sheet 2 is sent forward by the pairs of transport rollers 7b, 7c and 7d, then exposed to an optical image by being scanned with the laser optical system 14 and thereafter developed in the developing unit 15, whereby a visible image is formed.

As already described, the laminate of cleaning members 13, each having the covering layer of adhesive material 17, is provided immediately below the cutter 1, with the adhesive material 17 up.

Consequently, the dust D released from the sheet 2 by cutting with the cutter 1 spontaneously falls under gravity and adheres to the upper surface of the adhesive material 17' of the top cleaning member 13 which is positioned immediately below the cutter 1. Thus, the dust D released from the cut sheet 2 is prevented from scattering about.

Furthermore, the cleaning member 13 is so provided as to be removable from one side thereof at a position below the movable blade 12 of the cutter 1. Accordingly, the cleaning member 13 is removable with safety easily and quickly without the likelihood of projecting the finger to the position of the cutter blades.

Further according to the invention, a plurality of cleaning members 13 are provided in superposed layers, so that when a large amount of dust D adheres to the upper surface of the adhesive material 17' of the uppermost cleaning member 13 or when the adhesion of the material 17' has diminished, the uppermost cleaning member 13 is peeled off as seen in FIG. 6, thereby exposing the fresh surface of the next cleaning member 13 and removing the dust D on the uppermost layer of adhesive material 17'.

According to the present embodiment, therefore, the surface of fresh adhesive material 17 can be exposed easily with safety during maintenance, while the used cleaning member 13 is removable very quickly. This assures a high efficiency, further leading to the advantage that the recording apparatus is operable with dust D inhibited from scattering about.

Although the present invention has been described above with reference to the recording apparatus 100 which is equipped with the cutter 1, the invention is not limited to such recording appartus but is also applicable to other recording apparatus wherein record paper is processed by various devices and which has the portion to be exposed to released or spilled dust D, other than the cutter portion which releases paper particles. Another way of providing said cleaning member 13 is to set immediately below transport rollers 7a, 7b, 7c, 7d, 7e causing dust adhering to said paper to fall down. Furthermore another way of providing said cleaning member 13 is to set immediately below a sheet particle removing brush for brushing away any dust on said rollers, said sheet particle removing brush being provided in contact with said rollers 7a, 7b, 7c, 7d, 7e.

Although the present invention has been fully described by way of example with reference to the accompanying drawings, it is to be noted that various changes and modifications are apparent to those skilled in the art. Therefore, unless otherwise such changes and modifications depart from the scope of the invention, they should be construed as included therein.

What is claimed is:

1. A recording apparatus for forming an image on a recording paper comprising:
    means for feeding the recording paper drawn from roll storage paper along a predetermined path, said predetermined path including a portion where dust primarily from the recording paper accumulates;
    means for forming an image on said recording paper;
    a plurality of dust collecting means provided removably in superposed layers which are disposed at said portion for causing dust to adhere thereto, each of said dust collecting means including a base member and an adhesve layer covering said base member.

2. The recording apparatus as claimed in claim 1, wherein said feeding means comprises a pair of transport rollers and said portion is immediately below said transport rollers.

3. The recording apparatus as claimed in claim 1, wherein feeding means comprises cutter disposed along said path for cutting said paper and said portion is immediately below said cutter.

4. The recording apparatus as claimed in claim 1, wherein feeding means comprises sheet particle removing brush for brushing away any dust on said transport rollers and said portion is immediately below said sheet particle removing brush.

5. A recording apparatus for forming an image on a recording paper comprising:
    means for feeding the recording paper drawn from roll storage paper along a predetermined path;
    means for forming an image on said recording paper;
    cutter disposed along said path for cutting said paper, said cutter causing dust to scatter about;
    a plurality of dust collecting means provided removably in superposed layers for causing dust to adhere thereto, each of said dust collecting means including a base member and an adhesive layer covering said base member, said dust collecting means has a width at least larger than the width of said recording paper transversely thereof and a length larger than the length of said cutter in the direction of transport of said recording paper and is disposed immediately below said cutter.

* * * * *